United States Patent [19]
Epple et al.

[11] Patent Number: 5,295,737
[45] Date of Patent: Mar. 22, 1994

[54] ELECTRIC MOTOR-DRIVEN HYDRAULIC PUMP

[75] Inventors: Volker Epple, Stuttgart; Michael Klose, Besigheim; Klaus Mueller, Tamm; Wolfgang Maisch, Schwieberdingen, all of Fed. Rep. of Germany

[73] Assignee: Robert Bosch GmbH, Stuttgart, Fed. Rep. of Germany

[21] Appl. No.: 795,968

[22] Filed: Nov. 22, 1991

[30] Foreign Application Priority Data

Nov. 22, 1990 [DE] Fed. Rep. of Germany ....... 4037142

[51] Int. Cl.$^5$ .............................................. B60T 13/20
[52] U.S. Cl. ..................... 303/11; 303/116.1; 417/45
[58] Field of Search ........ 303/10, 11, 115 R, 115 EC, 303/116 R, 116 SP, 116 PC; 417/12, 32, 44, 45

[56] References Cited

U.S. PATENT DOCUMENTS

| | | | |
|---|---|---|---|
| 4,207,031 | 6/1980 | Maskrey | 417/12 |
| 4,402,554 | 9/1983 | Belart | 303/10 |
| 4,436,486 | 3/1984 | Jensen et al. | 417/45 |
| 4,518,903 | 5/1985 | Matsumoto et al. | 417/12 X |
| 4,524,312 | 6/1985 | Matsumoto et al. | 417/12 X |
| 4,699,435 | 10/1987 | Wupper | 303/11 |
| 4,848,847 | 7/1989 | Reinartz et al. | 303/11 |
| 4,955,790 | 9/1990 | Nakanishi et al. | 417/45 |
| 5,000,520 | 3/1991 | Schmitt | 303/10 |
| 5,015,151 | 5/1991 | Snyder, Jr. et al. | 417/44 X |
| 5,076,761 | 12/1991 | Krohn et al. | 417/45 X |

FOREIGN PATENT DOCUMENTS

| | | |
|---|---|---|
| 0313292 | 4/1989 | European Pat. Off. . |
| 2850883 | 5/1980 | Fed. Rep. of Germany . |
| 3241039 | 5/1984 | Fed. Rep. of Germany . |
| 3436343 | 4/1986 | Fed. Rep. of Germany . |
| 3813172 | 11/1989 | Fed. Rep. of Germany . |
| 3815768 | 11/1989 | Fed. Rep. of Germany . |
| 3816073 | 11/1989 | Fed. Rep. of Germany . |
| 3819490 | 12/1989 | Fed. Rep. of Germany . |
| 61-150858 | 7/1986 | Japan . |

*Primary Examiner*—Douglas C. Butler
*Assistant Examiner*—Alfred Muratori
*Attorney, Agent, or Firm*—Felfe & Lynch

[57] ABSTRACT

Circuit provides maximum current to an electric motor for a hydraulic pump in a brake system for a brief time interval after the motor is switched on, and thereafter limits the current to a lower value which corresponds to the torque necessary for generating the pressure required in the system.

5 Claims, 3 Drawing Sheets

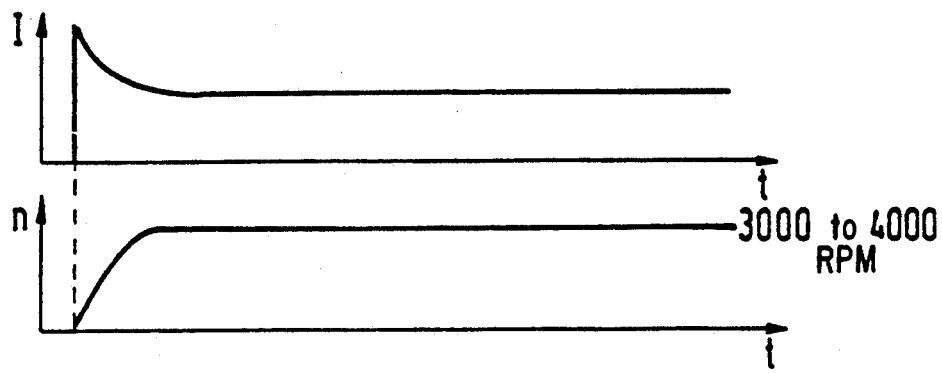
Fig. 2 PRIOR ART
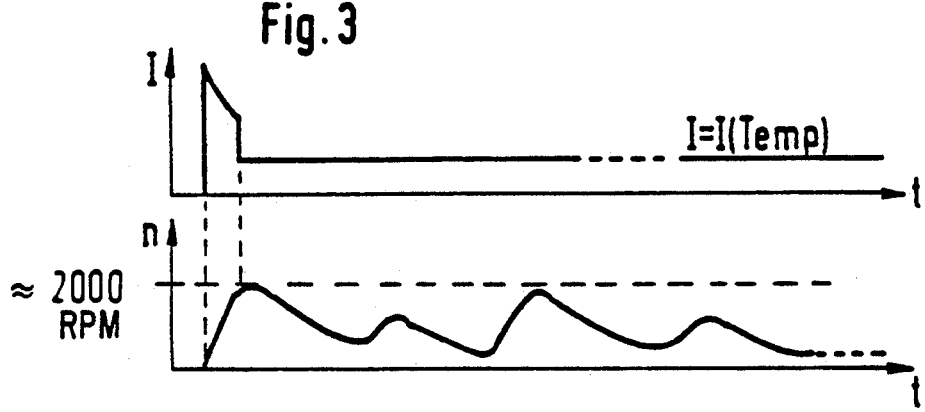
Fig. 3
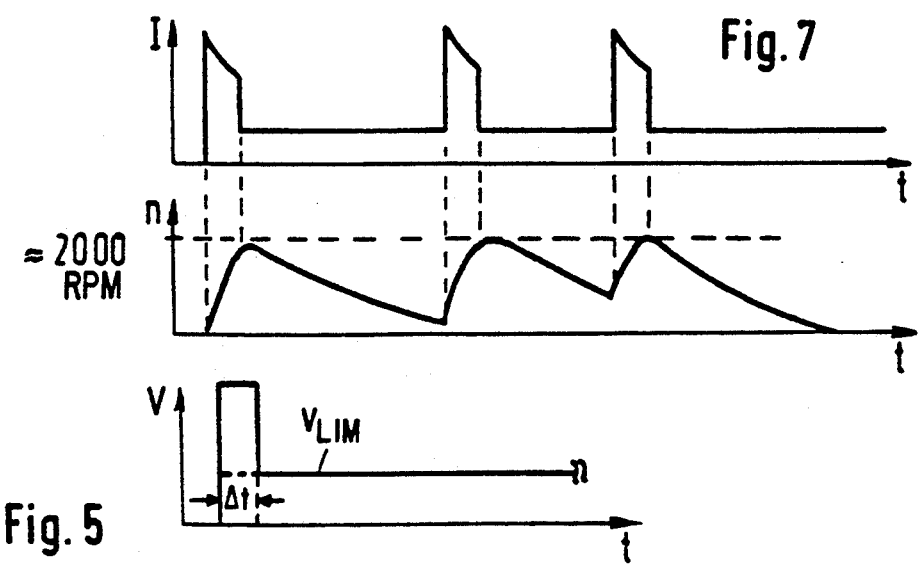
Fig. 7
Fig. 5

ELECTRIC MOTOR-DRIVEN HYDRAULIC PUMP

BACKGROUND OF THE INVENTION

In drive slip control systems the bias pressure for controlling the pressure at the brake is produced by means of a hydraulic unit which contains a motor-driven, valve-controlled pump. It is possible to use for this purpose, for example, the return pump of an antilock control system (U.S. Pat. No. 4,900,102). Antilock control systems are also known in which the bias pressure needed for raising the pressure in ABS controls is produced by means of a hydraulic pump unit and is made available to the ABS control by means of a pressure feed valve (U.S. Pat. No. 4,575,160). The pressure was formerly limited by means of hydraulic limit valves, wherein an electric current proportional to the motor torque under load or a speed proportional thereto is established. U.S. Pat. Nos. 4,900,102 and 4,575,160 are incorporated herein by reference.

SUMMARY OF THE INVENTION

The invention is addressed to the problem of establishing, with a valve-controlled piston pump aided by an electronic circuit, a motor speed proportional to the volume consumed and inversely proportional to the pressure (principle: electrical pressure limiting valve). This problem is solved in that the motor torque is limited via the motor current by a control circuit, and that, when the motor is turned on, a full current is briefly permitted.

The use of the current regulator permits the pump to have an output oriented to the volume input requirement of the load. This has the result that the pump motor only operates during pressure increase phases, and then with a low rotational speed and consequently low noise.

Thus a reduction of noise occurs during the pressure increase phases, during the holding or letting off of pressure the pump operates noiselessly. There is no hydraulic power loss (heat). Upon restarting the retained pressure of the hydraulic fluid compensates the acceleration phase of the electric motor. An "electrical" pressure limiting valve is produced, i.e., the fluid does not overrun the safety valve in (faultless) operation; thus there is no "frothing" problem at the pressure limiting valve.

BRIEF DESCRIPTION OF THE DRAWINGS

FIG. 2 is a graph of prior art current and RPM versus time;

FIG. 3 is a graph of current and RPM versus time for the first embodiment;

FIG. 5 is a graph of the voltage versus time for the first embodiment;

FIG. 7 is a graph of the current and RPM versus time for the second embodiment;

DETAILED DESCRIPTION OF THE PREFERRED EMBODIMENT

Figure 1:
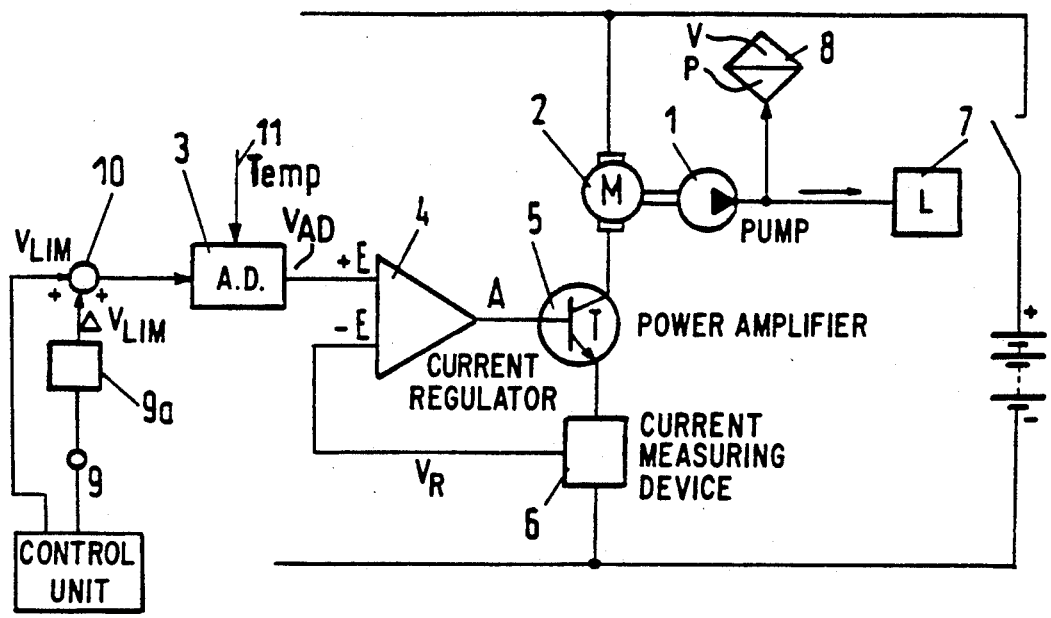
FIG. 1 is a schematic diagram of a first embodiment.

FIG. 1 shows a circuit in accordance with the invention for a valve-controlled hydraulic pump 1 which is driven by an electric motor 2. The circuit consists essentially of a limit value adapter 3 which produces the limit value adaptation for the noninverting input +E of a current regulator 4. The current regulator 4 controls a power amplifier 5 so that an increase of potential $V_{AD}$ at the input +E results also in an increase of potential at the controller output A and the motor current increases. The electrical current is converted by a current measuring device 6 to a proportional real-level voltage $V_R$ and is delivered to the inverting input −E of the current regulator 4. The working point of the circuit is the equality of the potential of the two signals $V_{AD}$ and $V_R$.

The hydraulic system represented in FIG. 1 is basically intended to represent the interaction of electric motor 2, pump 1 and volumetric load 7. A pressure sensor 8 is not part of the invention, and is only to symbolize the fact that, in addition to the volumetric consumption V of the load 7, the pressure p corresponding to the pressure volume characteristic of the hydraulic system from pump 1 to load 7 also increases whenever the pump 1 is turned on by a switch 10 and runs.

The part of FIG. 1 thus far described assumes the task of pressure limiting. The motor 2, supplied with a limited current, will continuously supply the pump 1 with a torque which corresponds to the desired limit pressure. Leakage at the load 7 is compensated by the pump-motor combination 2/1 by a brief rotation until the amount that has leaked is replaced by the amount thus delivered and the desired limit pressure is restored.

The pump thus rotates only when there is a need for a volumetric flow. The noise it produces is thus minimized. The method described can be used wherever a pump must be constantly in operation; if there is no volumetric flow demand the amount delivered by the pump will be blown off, as a rule, through a pressure limiting valve.

This also includes the diagrams in FIGS. 2 and 3, which in both cases show the flow over time and the rotatory speed over time, as it develops due to the increase and decrease or holding of the pressure corresponding to the operation of the antilock control.

FIG. 2 represents the state of the art. Here the rotatory speed of the pump motor rises to a load speed which corresponds to the current which the motor can draw.

In FIG. 3 the motor takes full current only briefly on start-up, for $\leq 100$ ms as a rule, and then the current limiter acts. As soon as the pump is required to operate at rising pressure the pump motor speed decreases. In the extreme case the pump stops (e.g., at 150 bar), which corresponds to the pressure limiting function described in the beginning.

When the hydraulic system again needs fluid—in the case of antilock control a pressure build-up is called for after a pressure drop—first the volume locked between the pump and the load valve (in ABS it is the control valve) expands into the load (brake calipers) . The pressure downstream of the pump drops and the pump motor starts up from the pressure-holding full stop to volume-delivering operation. The result is the speed curve represented in FIG. 3, with the feature of a lower maximum speed in comparison with the speed in FIG.

2; in the case of current limiting (FIG. 3) the maximum speed remains below 2000 rpm.

The starting pulse of FIG. 3 occurs in the circuit of FIG. 1 because, when the pump is turned on, a signal reaches a terminal 9, so that a block 9a then produces a pulse with the amplitude $\Delta V_{LIM}$ and a pulse width $\Delta t$; this pulse is superimposed on the limit voltage $V_{LIM}$ in the adder 10 and the sum serves as the limit voltage during the period $\Delta t$ (see FIG. 5).

Figure 4:
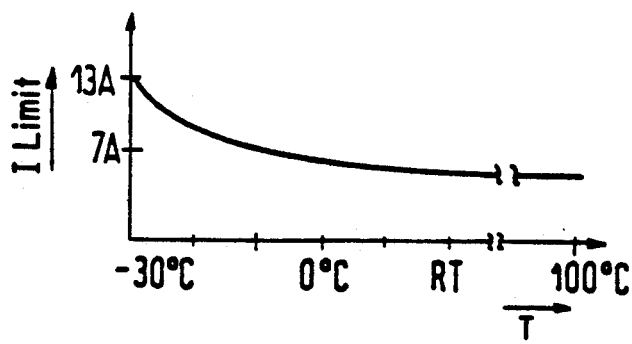
FIG. 4 is a typical graph of limit current versus motor temperature for the first embodiment.

The arrow 11 in FIG. 1 indicates that allowance is to be made for the relationship between the motor current and ambient temperature. The current limit is here made variable over a characteristic curve $I_L(T)$ so that the adjusted potential $V_{AD}$ is a function of temperature T. For an ABS/ASR motor, as described for example in U.S. Pat. No. 4,900,102, the curve appears approximately as shown in FIG. 4.

If the system must operate over a broad temperature range, especially in the low temperature range, without the provision of a temperature limiting device, the current limit must be set at a relatively high level so that the operation of the pump will be assured in cold weather. To prevent overspeeding in the normal temperature range due to the relatively high pump limit current, the maximum permissible pressure level must be set high. The pump therefore produces unnecessarily high pressures.

Figure 6:
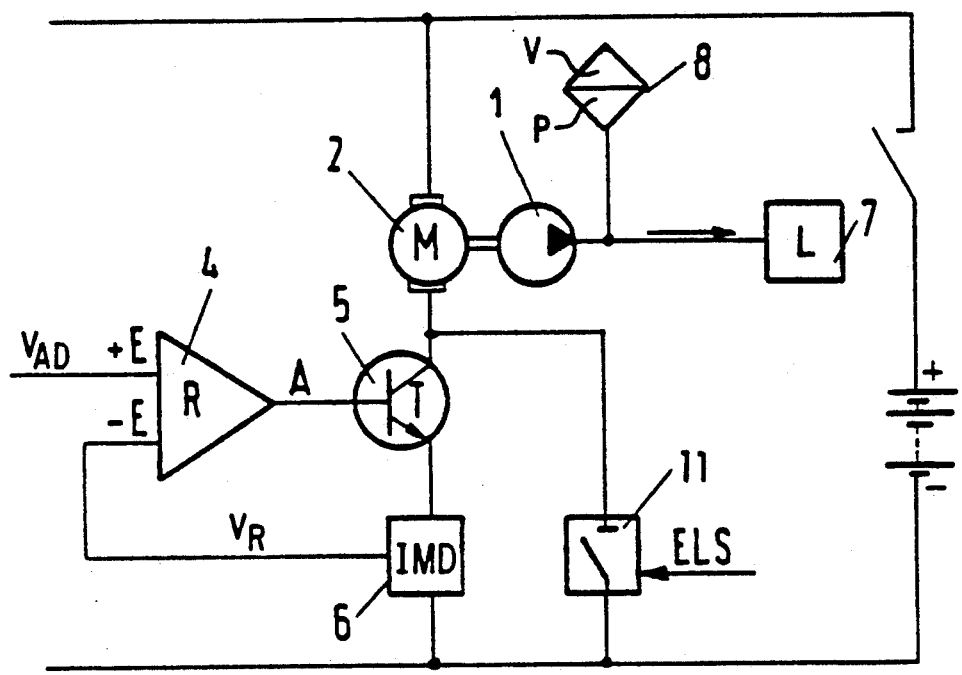
FIG. 6 is a schematic diagram of a second embodiment.
Figure 8:
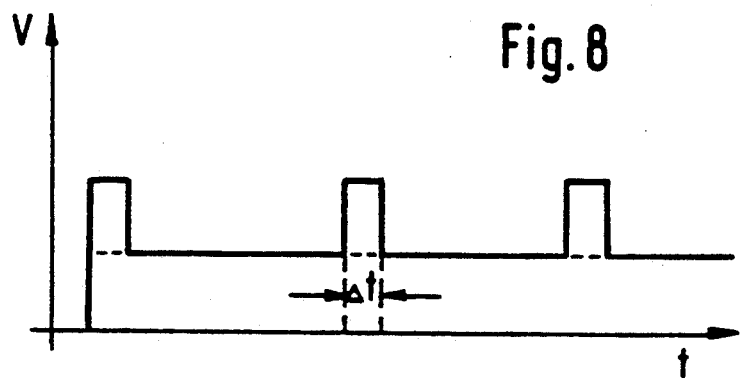
FIG. 8 is a graph of the voltage versus time for the second embodiment.

This can be remedied by brief operation of the motor at full current whenever another pressure increase is required, which is known from the signal (algorithm) of the operation (control unit) of the hydraulic system. Thus the limit value $V_{LIN}$ in FIG. 1 can be briefly raised (in a manner similar to FIG. 5), or—to relieve branch 3-4-5—an additional switch 11 (relay and power transistor) can be inserted, as shown in FIG. 6. In this case a voltage pulse lasting for a period $\Delta t$ is produced each time an increase in pressure to be supplied by the pump is needed in the system (e.g. ABS). This initiates a signal ELS which closes the switch 11. The corresponding diagrams are shown in FIGS. 7 and 8. By means of the above-described brief full-current control the pump motor will be able to start under all conditions.

A further improvement is achieved if the duration of the brief full-current power is varied according to the temperature. In FIG. 4, accordingly, instead of the current, the actuation time $\Delta t$ is used; in an ASR control it runs from 100 ms cold to a minimum of around 20 ms at room temperature.

What is claimed is:

1. A system for generating a required hydraulic pressure for brakes of a vehicle, said brakes being controlled by hydraulic pressure, said system comprising means for determining the required pressure, a hydraulic pump for generating said required pressure, an electric motor which immediately after switching on draws electric current up to a maximum current for driving said pump, said motor generating torque dependent on said current, means for switching on said motor, means for providing said motor with said maximum current for a predetermined time interval immediately after switching on and whenever an increase in hydraulic pressure is needed to generate said required pressure, and means for limiting said current between said time intervals to a fixed lower value which corresponds to the torque for maintaining the required hydraulic pressure.

2. A system as in claim 1 wherein said motor is switched on when an increase in pressure is required.

3. A system as in claim 1 wherein said means for limiting said current limits said current in dependence upon ambient temperature.

4. A system as in claim 1 wherein said time intervals are dependent upon ambient temperature.

5. A system as in claim 4 wherein said time intervals run from a maximum of 100 ms to a minimum of 20 ms.

* * * * *